United States Patent
Han

(10) Patent No.: US 9,727,401 B2
(45) Date of Patent: Aug. 8, 2017

(54) METHOD OF OPERATING SEMICONDUCTOR MEMORY DEVICE AND MEMORY SYSTEM INCLUDING SEMICONDUCTOR MEMORY DEVICE

(71) Applicant: SK hynix Inc., Gyeonggi-do (KR)

(72) Inventor: Ju Hyeon Han, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 54 days.

(21) Appl. No.: 14/815,143

(22) Filed: Jul. 31, 2015

(65) Prior Publication Data

US 2016/0259674 A1    Sep. 8, 2016

(30) Foreign Application Priority Data

Mar. 4, 2015   (KR) ......................... 10-2015-0030465

(51) Int. Cl.
G06F 11/07    (2006.01)

(52) U.S. Cl.
CPC .......... *G06F 11/076* (2013.01); *G06F 11/073* (2013.01)

(58) Field of Classification Search
CPC .. G06F 11/072; G06F 11/1048; G06F 11/073; G06F 11/076; G06F 2212/7207; G11C 29/52; G11C 16/3459; G11C 16/349
See application file for complete search history.

(56) References Cited

U.S. PATENT DOCUMENTS

| | | | | |
|---|---|---|---|---|
| 8,510,637 B2* | 8/2013 | Tseng | ..................... | G11C 16/10 714/721 |
| 9,053,822 B2* | 6/2015 | Lee | ......................... | G11C 29/04 |
| 2010/0174854 A1 | 7/2010 | Kim | | |
| 2014/0010017 A1* | 1/2014 | Lee | ......................... | G11C 16/26 365/185.18 |
| 2015/0135025 A1* | 5/2015 | Kim | .................... | G06F 12/0246 714/704 |

FOREIGN PATENT DOCUMENTS

| KR | 1020120105854 | 9/2012 |
|---|---|---|
| KR | 1020140051687 | 5/2014 |

* cited by examiner

*Primary Examiner* — Nadeem Iqbal
(74) *Attorney, Agent, or Firm* — IP & T Group LLP

(57) ABSTRACT

Disclosed is a method of operating a semiconductor memory device including a plurality of pages, including: receiving a program command, an address, and program data; reading page data from a selected page corresponding to the address in response to the program command; determining whether the number of bits of data corresponding to a program state among the page data is greater than a threshold value; and outputting a state fail signal without performing a program operation on the selected page based on a result of the determination.

18 Claims, 9 Drawing Sheets

FIG. 8

MPT

| BLK1 | PG1 | LBA1 |
| | ⋮ | |
| | PGn | LBAn |
| BLK2 | PG1 | empty |
| | ⋮ | |
| | PGn | empty |

⋮

| BLKz | PG1 | LBAj |
| | ⋮ | |
| | PGn | empty |

METHOD OF OPERATING SEMICONDUCTOR MEMORY DEVICE AND MEMORY SYSTEM INCLUDING SEMICONDUCTOR MEMORY DEVICE

CROSS-REFERENCE TO RELATED APPLICATION

The present application claims priority to Korean patent application number 10-2015-0030465, filed on Mar. 4, 2015, in the Korean Intellectual Property Office, the entire disclosure of which is herein incorporated by reference in its entirety.

BACKGROUND

1. Field

The present invention relates to an electronic device and, more particularly, to a method of operating a semiconductor memory device, and a memory system including the semiconductor memory device.

2. Discussion of Related Art

A semiconductor memory device is made using semiconductor materials, such as silicon (Si), germanium (Ge), gallium arsenide (GaAs), indium phosphide (InP), and the like. Semiconductor memory devices are generally classified into volatile memory devices and nonvolatile memory devices.

In volatile memory devices, data is lost when its power supply is cut off. Volatile memory devices include Static random access memory (SRAM), Dynamic RAM (DRAM), Synchronous DRAM (SDRAM), and the like. Nonvolatile memory devices can maintain their stored data even without a constant source of power. Nonvolatile memory devices include Read Only Memory (ROM), Programmable ROM (PROM), Electrically Programmable ROM (EPROM), Electrically Erasable and Programmable ROM (EEPROM), flash memory, Phase-change RAM (PRAM), Magnetoresistive RAM (MRAM), Resistive RAM (RRAM), Ferroelectric RAM (FRAM), and the like. Flash memory is generally divided into the NOR type and the NAND type.

SUMMARY

The present invention has been made in an effort to provide a semiconductor memory device with improved reliability, and a memory system including the same.

An exemplary embodiment of the present invention provides a method of operating a semiconductor memory device including a plurality of pages, including: receiving a program command, an address, and program data; reading page data from a selected page corresponding to the address in response to the program command; determining whether the number of bits of the data corresponding to a program state among the page data is greater than a threshold value; and outputting a state fail signal without performing a program operation on the selected page based on a result of the determination.

The state fail signal may be output when the number of bits of the data corresponding to the program state among the page data is greater than the threshold value.

The method may further include programming the program data on the selected page when the number of bits of the data corresponding to the program state among the page data is less than or equal to the threshold value.

The selected page may include a plurality of memory cells, each of which may be defined as a multi-level cell storing a plurality of data bits. In this case, the address may correspond to a Least Significant Bit (LSB) page of the selected page, and the reading of the page data may include reading data stored in the LSB page of the selected page as the page data.

The state fail signal may be output when the number of bits of the data corresponding to the program state among the page data is greater than the threshold value. The method may further include programming the program data on the LSB page of the selected page when the number of bits of the data corresponding to the program state among the page data is less than or equal to the threshold value.

Another exemplary embodiment of the present invention provides a method of operating a semiconductor memory device including a plurality of pages, and flag cells corresponding to the plurality of pages, respectively, the method including: receiving a program command, an address, and data, when the address corresponds to a Least Significant Bit (LSB) page of a selected page, reading page data from the LSB page of the selected page; reading flag data from a flag cell corresponding to the selected page; determining whether the number of bits of data corresponding to a program state among the page data is greater than a threshold value when the flag data does not correspond to a predetermined value; and outputting a state fail signal without performing a program operation on the selected page based on a result of the determination.

When the flag data corresponds to the predetermined value, the state fail signal may be output without programming the selected page.

The state fail signal may be output when the number of bits of the data corresponding to the program state among the page data is greater than the threshold value.

The method may further include programming the program data on the LSB page of the selected page when the number of bits of the data corresponding to the program state among the page data is less than or equal to the threshold value.

Yet another exemplary embodiment of the present invention provides a memory system, including: a semiconductor memory device including a plurality of memory blocks, each of which includes a plurality of pages; and a controller suitable for transmitting a special program command to the semiconductor memory device when a program operation is performed on a page within a first memory block among the plurality of memory blocks, and transmitting a normal program command to the semiconductor memory device when a program operation is performed on a page within a second memory block among the plurality of memory blocks. The semiconductor memory device may read page data from a selected page in response to the special program command, determine whether the number of bits of data corresponding to a program state among the page data is greater than a threshold value, and output a state fail signal without programming the selected page based on a result of the determination.

A memory block including a programmed page among the plurality of memory blocks may be defined as the first memory block, and an empty memory block among the plurality of memory blocks may be defined as the second memory block.

The controller may store a map table including a mapping relation between a logic block address and a physical block address, and the first memory block and the second memory block may be defined based on the map table.

Each of the plurality of pages may include a plurality of memory cells, each of which may be defined as a multi-level cell storing a plurality of data bits. The controller may transmit an address to the semiconductor memory device together with the special program command, the address may correspond to a Least Significant Bit (LSB) page of the selected page, and the semiconductor memory device may read data stored in the LSB page of the selected page as the page data.

The state fail signal may be output when the number of bits of the data corresponding to the program state among the page data is greater than the threshold value.

When the number of bits of the data corresponding to the program state among the page data is less than or equal to the threshold value, the semiconductor memory device may program program data from the controller in the selected page.

The semiconductor memory device may program program data from the controller in a second selected page in response to the normal program command.

According to the present invention, it is possible to provide a semiconductor memory device with improved reliability, and a memory system including the same.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 8 is a diagram conceptually Illustrating a map table of FIG. 7;

DETAILED DESCRIPTION

Hereinafter, exemplary embodiments of the present invention will be described with reference to the accompanying drawings in detail. In the description below, it should be noted that only parts necessary for understanding operations according to the present invention will be explained, and an explanation of other parts will be omitted so not to obscure the present invention. The present invention is not limited to the exemplary embodiments described herein, and may be embodied in different forms. The exemplary embodiments are provided for describing the invention in detail so that those skilled in the art may apply the technical spirit of the present invention.

Throughout this specification and the claims that follow, when it is described that an element is "coupled" to another element, the element may be "directly coupled" to the other element or "electrically coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

Figure 1:
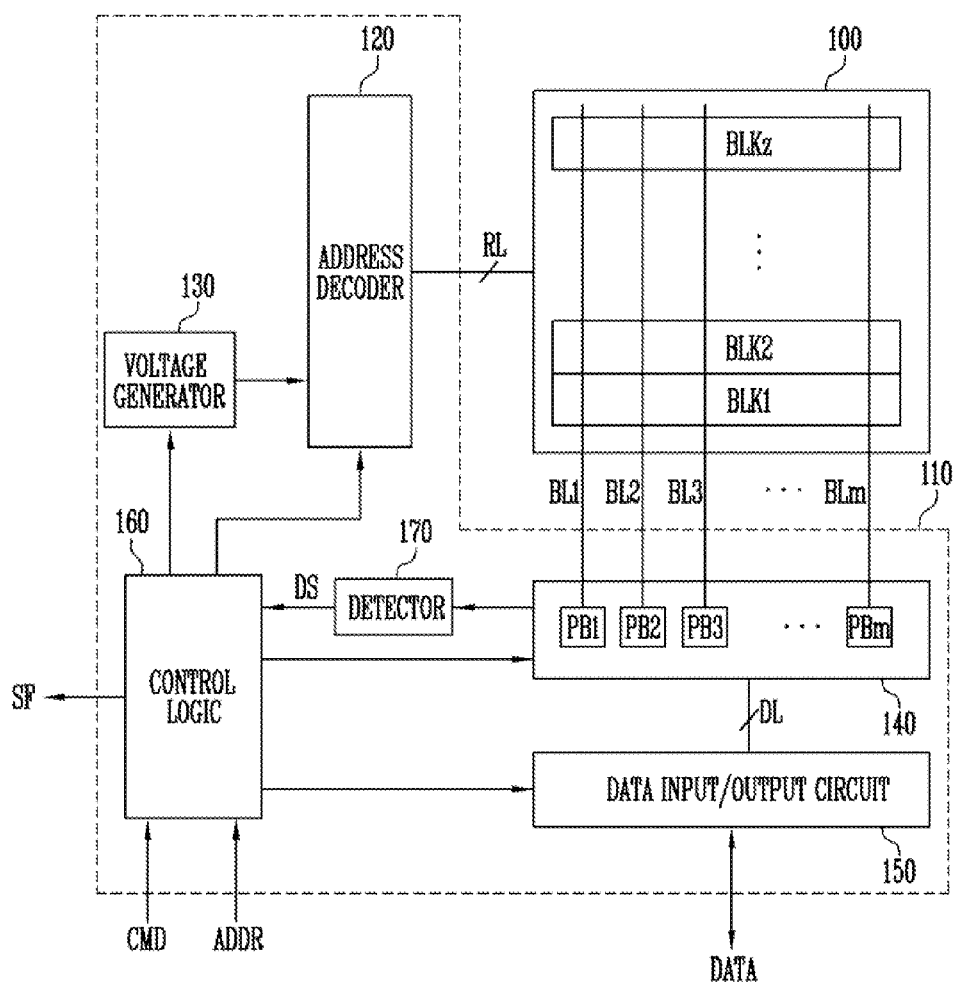
FIG. 1 is a block diagram illustrating a semiconductor memory device according to an exemplary embodiment of the present invention.
Figure 2:
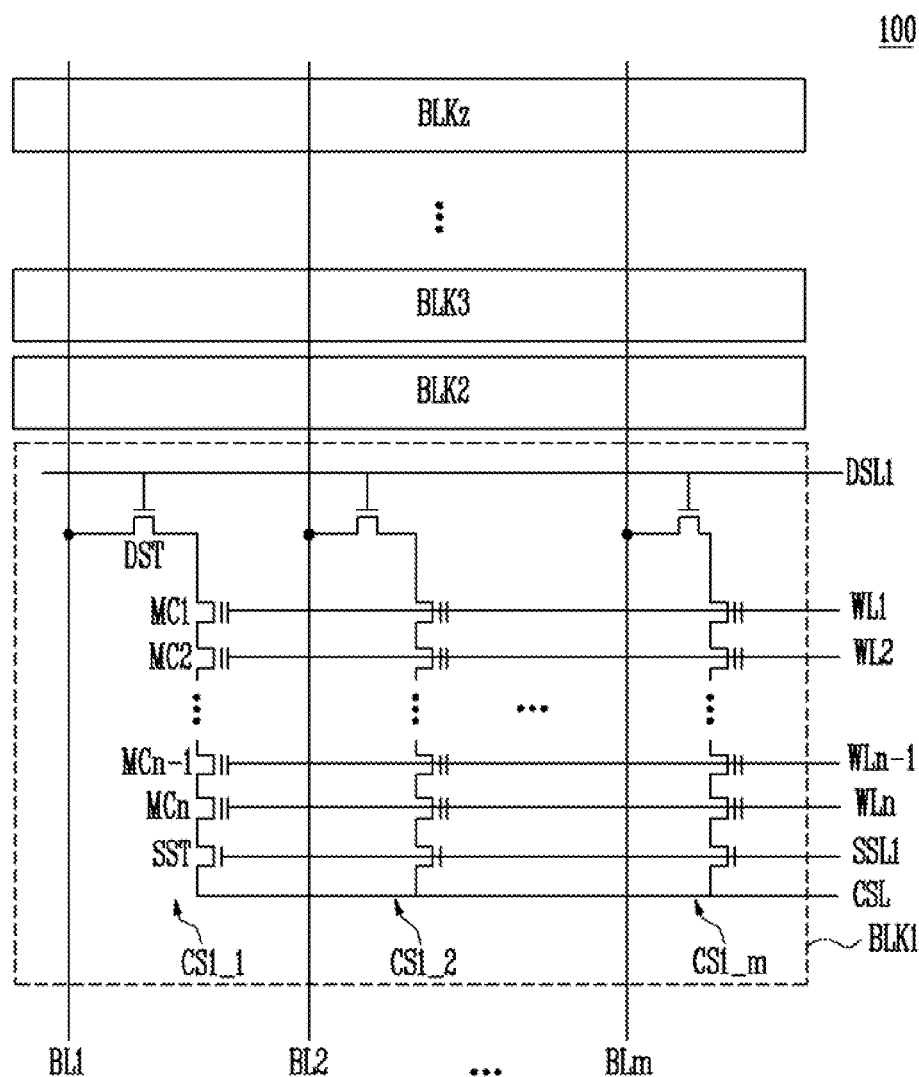
FIG. 2 is a block diagram illustrating a memory cell array of FIG. 1.

FIG. 1 is a block diagram illustrating a semiconductor memory device 50 according to an exemplary embodiment of the present invention. FIG. 2 is a block diagram illustrating a memory cell array 100 of FIG. 1.

Referring to FIG. 1, the semiconductor memory device 50 includes a memory cell array 100 and a peripheral circuit 110.

The memory cell array 100 includes a plurality of memory blocks BLK1 to BLKz. The plurality of memory blocks BLK1 to BLKz are connected to an address decoder 120 through row lines RL, and connected to a read and write circuit 140 through bit lines BL1 to BLm. Each of the plurality of memory blocks BLK1 to BLKz includes a plurality of memory cells. In this exemplary embodiment, the memory cells are nonvolatile memory cells.

Referring to FIG. 2, the memory cell array 100 includes a plurality of memory blocks BLK1 to BLKz. The first to $z^{th}$ memory blocks BLK1 to BLKz are commonly connected to the first to $m^{th}$ bit lines BL1 to BLm.

In FIG. 2, for convenience, elements included in the first memory block BLK1 are illustrated, and elements included in each of the remaining memory blocks BLK2 to BLKz are omitted. It will be understood that each of the remaining memory blocks BLK2 to BLKz is configured in the same manner as the first memory block BLK1.

The memory block BLK1 includes a plurality of cell strings CS1_1 to CS1_m. The first to $m^{th}$ cell strings CL1_1 to CL2_m are connected to the first to $m^{th}$ bit lines BL1 to BLm, respectively.

Each of the first to $m^{ut}$ cell strings CS1_1 to CS1_m includes a drain selection transistor DST, a plurality of serially connected memory cells MC1 to MCn, and a source selection transistor SST. The drain selection transistor DST includes a gate connected to a drain selection line DSL1. The first to $n^{th}$ memory cells MC1 to MCn include gates connected to first to $n^{th}$ word lines WL1 to WLn, respectively. The source selection transistor SST includes a gate connected to a source selection line SSL1. A drain side of the drain selection transistor DST is connected to a corresponding bit line. The drain selection transistors of the first to $m^{th}$ cell strings CL1_1 to CL1_m are connected to the first to $m^{th}$ bit lines BL1 to BLm, respectively. A source side of the source selection transistor SST is connected to a common source line CSL. The common source line CSL may be commonly connected to the first to $z^{th}$ memory blocks BLK1 to BLKz.

The drain selection line DSL1, the first to nth word lines WL1 to WLn, the source selection line SSL1, and the common source line CSL are included in the row lines RL of FIG. 1. The drain selection line DSL1, the first to $n^{th}$ word lines WL1 to WLn, the source selection line SSL1, and the common source line CSL are controlled by the address decoder 120. The first to $m^{th}$ bit lines BL1 to BLm are controlled by the read and write circuit 140.

Referring back to FIG. 1, the peripheral circuit 110 includes the address decoder 120, a voltage generator 130, the read and write circuit 140, a data input/output circuit 150, a control logic 160, and a detector 170.

The address decoder 120 is connected to the memory cell array 100 through the row lines RL. The address decoder 120 is configured to operate under the control of the control logic 160.

The address decoder 120 receives an address ADDR through the control logic 160. A read and program operation of the semiconductor memory device 50 is performed in units of word lines. An erase operation of the semiconductor memory device 50 is performed in units of memory blocks. During the program and read operation, the address ADDR may include a block address and a row address. During the erase operation, the address ADDR may include a block address.

The address decoder 120 is configured to decode the block address among the received addresses ADDR. The address decoder 120 selects one memory block from the memory blocks BLK1 to BLKz based on the decoded block address.

The address decoder 120 is configured to decode a row address among the received addresses ADDR. The address decoder 120 applies voltages received from the voltage generator 130 based on the decoded row address to the row lines RL, and selects one word line of the selected memory block.

The address decoder 120 may include an address buffer, a block decoder, and a row decoder.

The voltage generator 130 is configured to generate a plurality of voltages by using an external power voltage supplied to the semiconductor memory device 50. The voltage generator 130 is configured to operate under the control of the control logic 160.

In an embodiment, the voltage generator 130 may regulate the external power voltage and generate an internal power voltage. The internal power voltage generated by the voltage generator 130 is used as an operation voltage of the semiconductor memory device 50.

In an embodiment, the voltage generator 130 may generate a plurality of voltages by using the external power voltage or the internal power voltage. For example, the voltage generator 130 may include a plurality of pumping capacitors receiving the internal power voltage, and selectively activate the plurality of pumping capacitors under the control of the control logic 160 to generate a plurality of voltages. The generated voltages may be applied to the word lines by the address decoder 120.

The read and write circuit 140 includes first to $m^{th}$ page buffers PB1 to PBm. The first to $m^{th}$ page buffers PB1 to PBm are connected to the memory cell array 100 through the first to $m^{th}$ bit lines BL1 to BLm, respectively. The first to $m^{th}$ page buffers PB1 to PBm operate under the control of the control logic 160.

The first to $m^{th}$ page buffers PB1 to PBm communicate data with the data input/output circuit 150. During the program operation, the first to $m^{th}$ page buffers PB1 to PBm receive program data through the data lines DL from the data input/output circuit 150. The first to $m^{th}$ page buffers PB1 to PBm may program the program data in the memory cells connected to the selected word line through the bit lines BL1 to BLm. During the read operation, the first to $m^{th}$ page buffers PB1 to PBm read page data from the memory cells connected to the selected word line through the bit lines BL1 to BLm. The first to $m^{th}$ page buffers PB1 to PBm may output the read page data to the data input/output circuit 150 through the data lines DL, or to the detector 170.

In an embodiment, the read and write circuit 140 may include a column selection circuit.

The data input/output circuit 150 is connected to the first to $m^{th}$ page buffers PB1 to PBm through the data lines DL. The data input/output circuit 150 is operated under the control of the control logic 160. The data input/output circuit 150 communicates data DATA with an external controller 1200 (see FIG. 7).

The control logic 150 is connected to the address decoder 120, the voltage generator 130, the read and write circuit 140, the data input/output circuit 150, and the detector 170. The control logic 160 receives a command CMD and the address ADDR from the external controller. The control logic 160 is configured to control the address decoder 120, the voltage generator 130, the read and write circuit 140, the data input/output circuit 150, and the detector 170 in response to the command CMD. The control logic 160 transmits the address ADDR to the address decoder 120.

According to an exemplary embodiment of the present invention, the control logic 160 controls the peripheral circuit 110 so as to read the page data from the selected page in response to a command CMD (hereinafter, referred to as a "program command") instructing the program operation. The address decoder 120 may select a word line corresponding to the address ADDR. Accordingly, one page is selected. Further, the read and write circuit 140 may read page data from the selected page through the first to $m^{th}$ bit lines BL1 to BLm. The read page data may be temporarily stored in the first to $m^{th}$ page buffers PB1 to PBm.

The detector 170 is connected to the read and write circuit 140 and the control logic 160. The detector 170 determines whether the number of bits of data corresponding to a program state among the page data stored in the read and write circuit 140 is greater than a threshold value under the control of the control logic 160. The data bit corresponding to the program state may be, for example, data bits having a logic value of "0". The data bit corresponding to an erase state may be, for example, data bits having a logic value of "1". For example, the detector 170 may count the number of data bits having the logic value of "0", and compare the counted value with a threshold value. As another example, the detector 170 may include a predetermined analog circuit, and reflect data bits having the logic value of "0" on comparison impedance, and compare the comparison impedance with impedance corresponding to a threshold value.

When the number of bits of the data corresponding to the program state among the page data is greater than the threshold value, the detector 170 may enable a detection signal DS, and when the number of bits of the data corresponding to the program state among the page data is less than or equal to the threshold value, the detector 170 may disable the detection signal DS.

When the detection signal DS is enabled, a state fail signal SF may be output without programming program data in the selected page. The external controller may recognize that the program data is not stored in the semiconductor memory device 50 in response to the state fail signal SL. Then, the external controller may command the semiconductor memory device 50 so as to, for example, program the program data in another page. When the detection signal DS is disabled, the program data may be programmed in the selected page. In an exemplary embodiment, when the program operation is completed, a program pass signal may be output.

Figure 3:
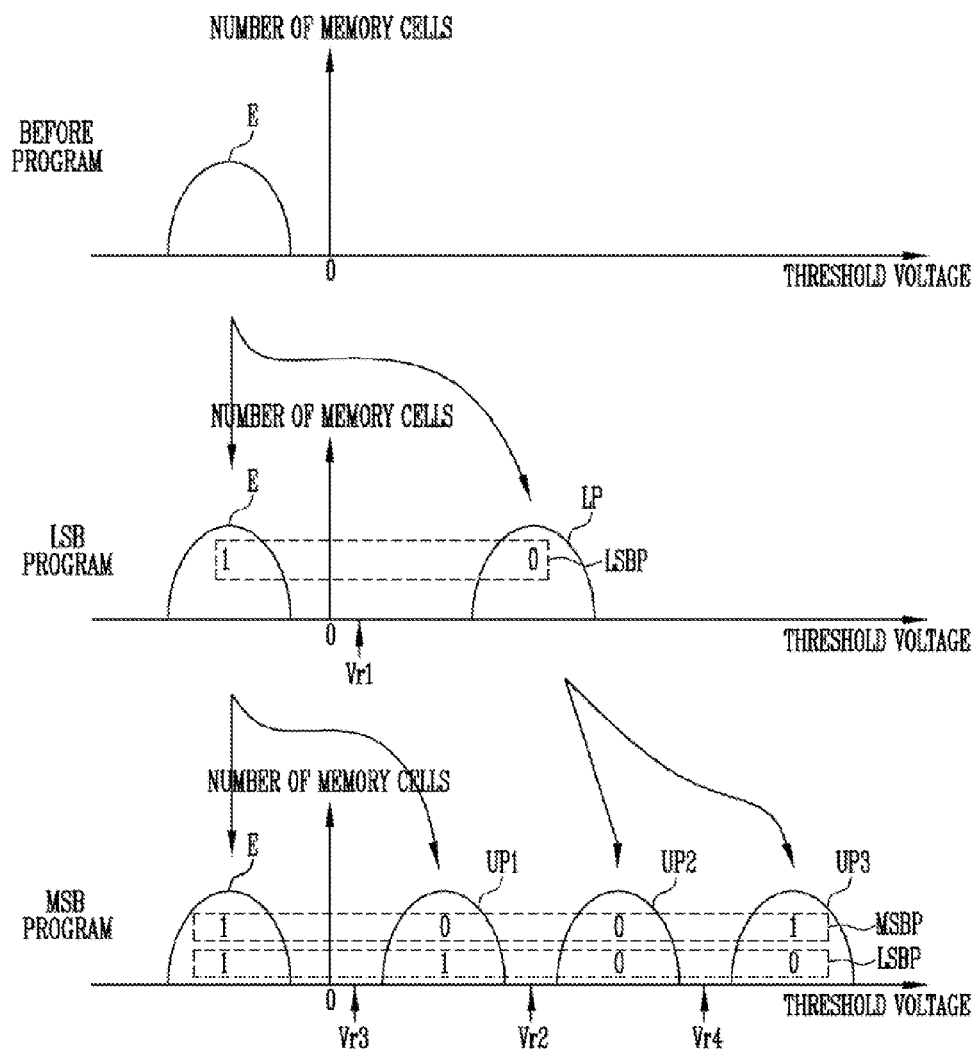
FIG. 3 is a diagram illustrating a threshold voltage distribution of a selected page when a Least Significant Bit (LSB) program and a Most Significant Bit (MSB) program are performed.

FIG. 3 is a diagram illustrating a threshold voltage distribution of a selected page when a Least Significant Bit (LSB) program and a Most Significant Bit (MSB) program are performed. In FIG. 3, a horizontal axis indicates a threshold voltage, and a vertical axis indicates the number of memory cells.

Referring to FIG. 3, the memory cells of the selected page have an erase state E before a program operation. For example, a voltage range corresponding to the erase state E may be lower than that of a ground. For example, it may be defined that the memory cells in the erase state E store the logic value of "1".

During an LSB program, the memory cells in the erase state E are programmed to have the erase state E or a Lower Program (LP) state. When one data bit is stored in each memory cell, one LSB page LSBP is defined in the selected page. For example, it may be defined that the memory cells in the erase state E store the logic value of "1", and the memory cells in the LP state store the logic value of "0".

When the LSB page LSBP is stored in the selected page, and an MSB page MSBP has not been stored yet, a first read voltage Vr1 is applied to the selected word line, so that data of the LSB page LSBP is read as page data.

After the LSB program, an MSB program is performed. According to the program data, the memory cells in the erase state E and the LP state are programmed to have first to third upper program states UP1 to UP3. For example, the memory cell in the erase state E may be programmed to have the erase state E or the first upper program state UP1, and the memory cell in the LP state may be programmed to have the second upper program state UP2 or the third upper program state UP3. To this end, the first read voltage Vr1 is applied to the selected word line, so that data of the LSB page LSBP is read, and the MSB program may be performed by referring to the read data.

Accordingly, the MSB page MSBP is added to the selected page. After two data bits are stored in each memory cell, the LSB page LSBP and the MSB page MSBP are defined in the selected page.

In an exemplary embodiment, the erase state E may correspond to data "11", the first upper program state UP1 may correspond to data "01", the second upper program state UP2 may correspond to data "00", and the third upper program state UP3 may correspond to data "10". That is, the LSBs (a) in the erase state E and the first to third upper program states UP1 to UP3 are defined as "1", "1", "0", and "0", respectively, and the MSBs (b) in the erase state E and the first to third upper program states UP1 to UP3 are defined as "1", "0", "0", and "1", respectively.

It is assumed that all of the LSB page LSBP and the MSB page MSBP are stored in the selected page. When the LSB page LSBP is read, a second read voltage Vr2 is applied to the selected word line, so that the data stored in the LSB page LSBP may be read as page data. When the MSB page MSBP is read, a third read voltage Vr3 may be applied to the selected word line to perform a first read operation, and a fourth read voltage Vr4 may be applied to the selected word line to perform a second read operation, and the data stored in the MSB page MSBP may be determined based on results of the first and second read operations.

Figure 4:
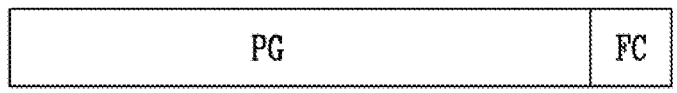
FIG. 4 is a conceptual diagram for describing memory cells connected to each word line.

FIG. 4 is a conceptual diagram for describing the memory cells connected to each word line.

Referring to FIG. 4, the memory cells connected to one word line includes memory cells configuring a page PG and one or more flag cells FC. The program data is stored in the page PG. The LSB page LSBP and the MSB page MSBP may be included in the page PG. The flag cell FC determines whether the MSB page MSBP is stored in the corresponding page PG. For example, when the flag cell FC stores the logic value of "1", it means that the MSB page MSBP is not stored in the corresponding page PG. For example, when the flag cell FC stores the logic value of "0", it means that the MSB page MSBP is stored in the corresponding page PG. In an exemplary embodiment, the flag cell FC may have the erase state E (see FIG. 3) or the third upper program state UP3 (see FIG. 3).

The row address of the address ADDR (see FIG. 1) received during the read operation may include information on the LSB page LSBP or the MSB page MSBP. When the LSB page LSBP is read, the semiconductor memory device 50 may determine whether the selected page includes only the LSB page LSBP or includes both the LSB page LSBP and the MSB page MSBP based on the data stored in the flag cell FC. When the selected page includes only the LSB page LSBP, the first read voltage Vr1 is applied to the selected word line, so that data of the LSB page LSB may be read. When the selected page includes both the LSB page LSBP and the MSB page MSBP, the second read voltage Vr2 is applied to the selected word line, so that data of the LSB page LSB may be read.

The flag cell FC is connected to the same word line, and the read operation of the semiconductor memory device 50 is performed in the units of word lines. Accordingly, when the page data is read from the page PG, flag data may be read from the flag cell FC as well.

In the meantime, the row address of the address ADDR (see FIG. 1) received during the program operation includes information on the LSB page LSBP or the MSB page MSBP. When the address ADDR corresponds to the LSB page LSBP, the LSB program described with reference to FIG. 3 may be performed. When the address ADDR corresponds to the MSB page MSBP, the MSB program described with reference to FIG. 3 may be performed.

It is assumed that when the LSB page LSBP and the MSB page MSBP have been already stored in the selected page, the address ADDR for the MSB program on the MSB page MSBP is input. First, the first read voltage Vr1 is applied to the selected word line, so that data of the LSB page LSBP is read, and the MSB program may be performed according to the read data. When the data of the LSB page LSBP is read, the flag data may be read. The flag data may indicate that the MSB page MSBP is stored in the selected page. According to the flag data, the control logic 160 may control the peripheral logic 110 so as not to perform the MSB program. In this case, the control logic 160 may output the state fail signal SF.

It is assumed that when the LSB page LSBP has been already stored in the selected page, the address ADDR for the LSB program on the LSB page LSBP is input. A flag cell indicating that the LSB page LSBP is stored in the selected page may not be provided. The semiconductor memory device 50 may perform the LSB program while not recognizing that the memory cells of the selected page already have the erase state E and the LP state. That is, the LSB program may repeatedly perform on the selected page. In this case, data, which has been already stored in the LSB page LSBP of the selected page, may be damaged.

Figure 5:
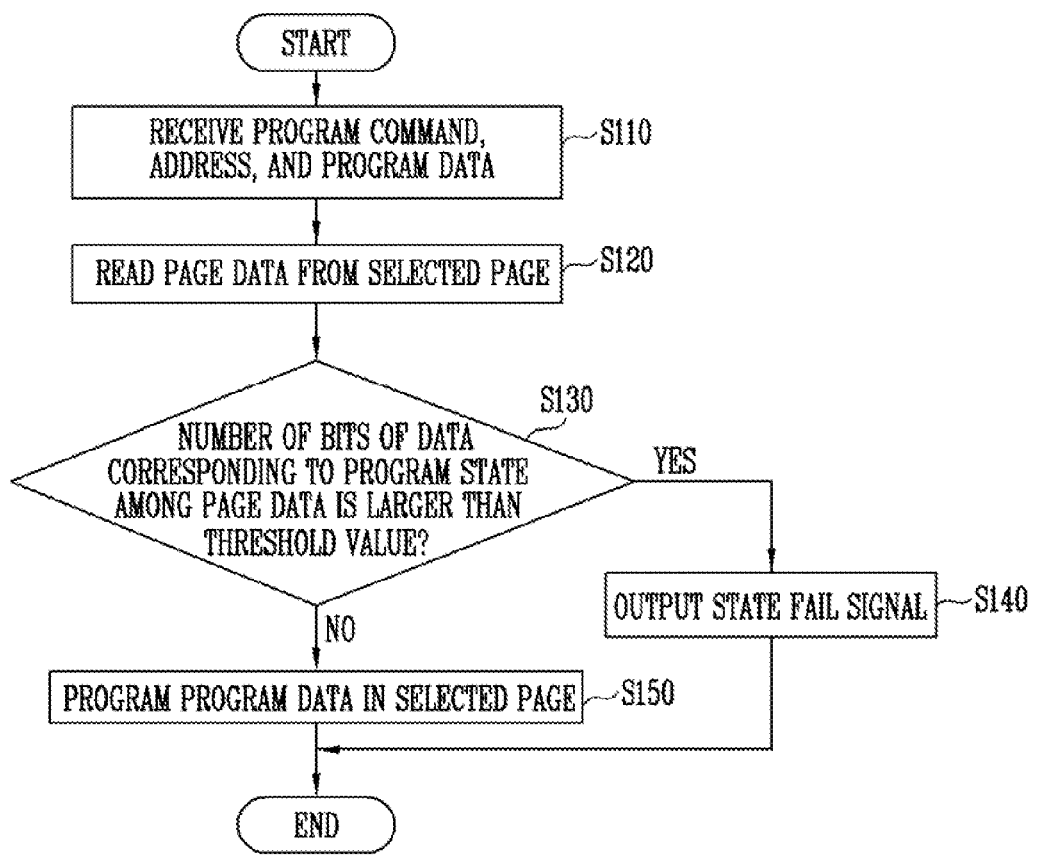
FIG. 5 is a flowchart illustrating a method of operating the semiconductor memory device of FIG. 1.

FIG. 5 is a flowchart illustrating a method of operating the semiconductor memory device 50 of FIG. 1.

Referring to FIGS. 1 and 5, a program command CMD, an address ADDR, and program data are received in the semiconductor memory device 50 in operation S110. The program command CMD, the address ADDR, and the program data may be sequentially received.

In operation S120, the semiconductor memory device 50 first reads page data from a selected page. When the address ADDR corresponds to the LSB page, the semiconductor memory device 50 may read the page data from an LSB page of the selected page. For example, the first read voltage Vr1 (see FIG. 3) may be applied to a selected word line, so that the page data may be read. Each data bit of the page data may correspond to any one of an erase state and a program state. For example, the memory cell having a threshold voltage lower than the first read voltage Vr1 may be read with a logic value of "1". The logic value of "1" means that the corresponding memory cell has the erase state E (see FIG. 3). The memory cell having a threshold voltage higher than or equal to the first read voltage Vr1 may be read with the logic value of "0". The logic value of "0" means that the corresponding memory cell has the LP state (see FIG. 3).

In operation S130, the semiconductor memory device 50 determines whether the number of bits of the data corresponding to the program state among the read page data is greater than a threshold value. For example, when the number of bits of the data corresponding to the program state is less than or equal to the threshold value, it means that most of the memory cells have the erase state, and the LSB page is not stored in the selected page. For example, when the number of bits of the data corresponding to the program state is greater than the threshold value, it means that the LSB page has been already stored in the selected page. In an exemplary embodiment, the threshold value may be stored in a register (not illustrated) within the control logic 160 and provided to the detector 170. The detector 170 determines whether the number of bits of the data corresponding to the program state among the page data is greater than the threshold value, and outputs a detection signal DS.

In operation S140, when it is determined that the number of bits of the data corresponding to the program state among the read page data is greater than the threshold value in operation S130 (YES), the semiconductor memory device 50 outputs a state fail signal SF. The external controller may recognize that the program operation is not normally performed according to the state fail signal SF.

In operation S150, when it is determined that the number of bits of the data corresponding to the program state among the read page data is less than or equal to the threshold value in operation S130 (NO), the semiconductor memory device 50 performs the program operation on the selected page. The address decoder 120 may apply a high program voltage to a selected word line. The read and write circuit 140 may transmit program data to the first to $m^{th}$ bit lines BL1 to BLm. Accordingly, the LSB page LSBP may be performed on the selected page. When the program operation is completed, the semiconductor memory device 50 may output a program pass signal. The external controller may recognize that the program operation is normally performed according to the program pass signal.

According to the exemplary embodiment of the present invention, it is possible to prevent the selected page from being repeatedly programmed. Accordingly, the semiconductor memory device 50 with improved reliability is provided.

Figure 6:
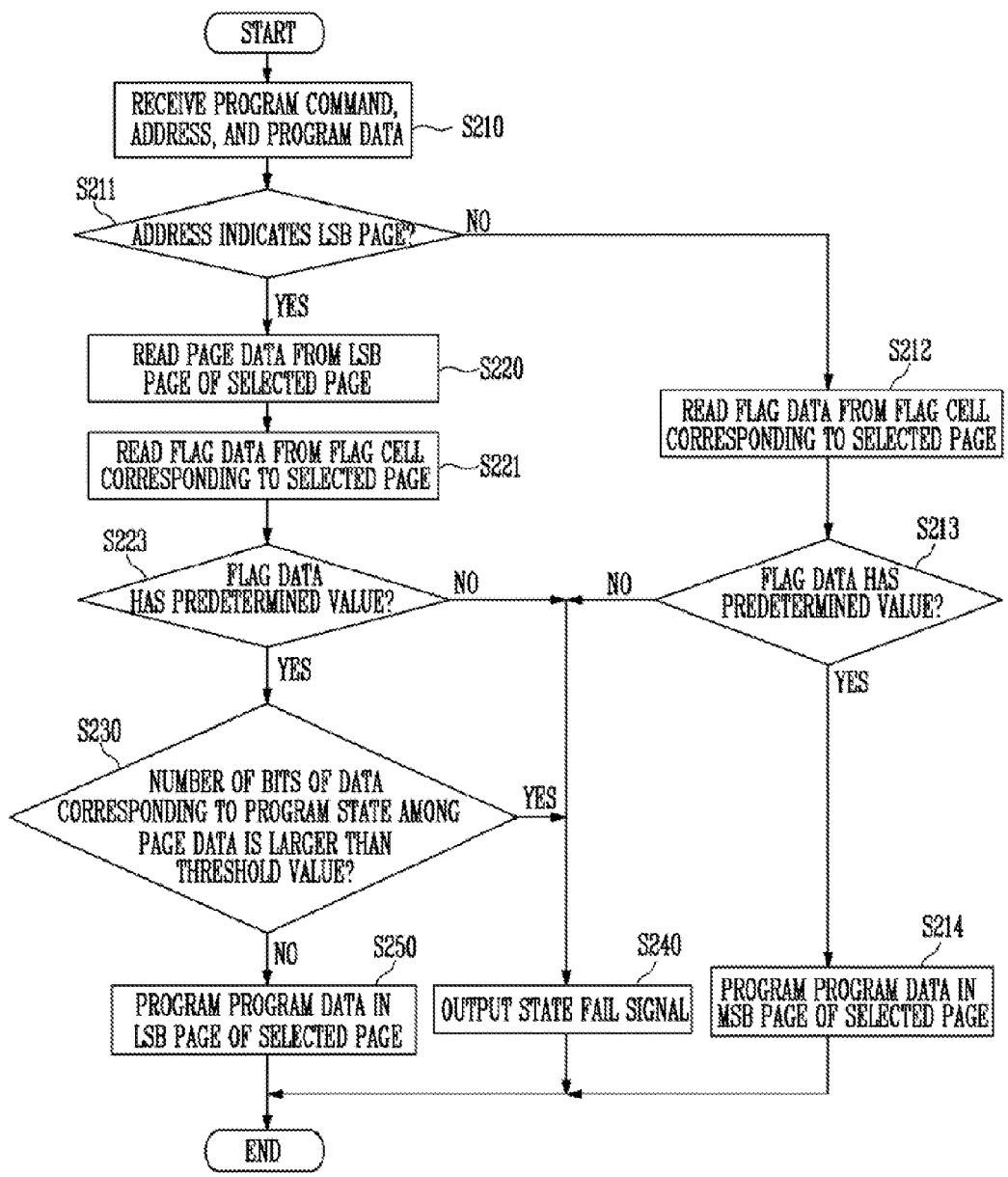
FIG. 6 is a flowchart illustrating a method of operating the semiconductor memory device FIG. 1 according to another exemplary embodiment.

FIG. 6 is a flowchart illustrating a method of operating the semiconductor memory device 50 of FIG. 1 according to another exemplary embodiment.

Referring to FIGS. 1 and 6, a program command CMD, an address ADDR, and program data are received in the semiconductor memory device 50 in operation S210. The program command CMD, the address ADDR, and the program data may be sequentially received.

In operation S211, it is determined whether the address ADDR corresponds to the LSB page. When the address ADDR corresponds to the LSB page, it means that the LSB program described with reference to FIG. 3 is commanded. When the address ADDR corresponds to the MSB page, it means that the MSB program described with reference to FIG. 3 is commanded.

In operation S220, when it is determined that the address ADDR corresponds to the LSB page in operation S211 (YES), the semiconductor memory device 50 reads page data from the LSB page of the selected page. In operation S221, the semiconductor memory device 50 reads flag data from the flag cell FC corresponding to the selected page. The selected page and the flag cell FC are connected to the same word line. Accordingly, operation S220 and operation S221 may be performed during a single read operation. For example, the first read voltage Vr1 (see FIG. 3) may be applied to a selected word line, so that the page data may be read. In this case, the flag data may also be read.

In operation S223, it is determined whether the flag data has a predetermined value. The flag data may indicate whether the MSB page MSBP (see FIG. 3) is stored in the corresponding page. When the flag data has a predetermined value, for example, a logic value of "1", the corresponding page does not store the MSB page MSBP. When the flag data does not have the predetermined value, the corresponding page stores the MSB page MSBP. When the MSB page MSBP is stored in the selected page, it means that the LSB page LSBP and the MSB page MSBP are stored in the selected page. Accordingly, when the flag data does not have the predetermined value, the LSB program cannot be performed. In operation S240, when it is determined that the flag data does not have the predetermined value in operation S223 (NO), the semiconductor memory device 50 outputs the state fall signal without the LSB program.

In operation S230, when it is determined that the flag data has the predetermined value in operation S223 (YES), it is determined whether the number of bits of the data corresponding to the program state among the page data is greater than a threshold value.

When it is determined that the number of bits of the data corresponding to the program state among the page data is greater than the threshold value in operation S230 (YES), operation S240 is performed. In operation S240, the semiconductor memory device 50 outputs the state fail signal without the LSB program.

When it is determined that the number of bits of the data corresponding to the program state among the page data is less than or equal to the threshold value in operation S230 (NO), operation S250 is performed. In operation S250, the semiconductor memory device 50 performs the LSB program on the selected page. After the LSB program is completed, the semiconductor memory device 50 may output a program pass signal.

In operation S212, when it is determined that the address ADDR corresponds to the LSB page in operation S211 (NO), the semiconductor memory device 50 reads flag data from the flag cell corresponding to the selected page. The first read voltage Vr1 is applied to the word line connected with the selected page, so that the page data may be read from the LSB page LSBP of the selected page together with the flag data. The page data and the flag data may be temporarily stored in the first to $m^{th}$ page buffers PB1 to PBm.

In operation S213, it is determined whether the flag data has a predetermined value. When it is determined that the flag data does not have the predetermined value in operation S213 (NO), operation S240 is performed. In operation S240, the semiconductor memory device 50 outputs the state fail signal without the LSB program.

When it is determined that the flag data has the predetermined value in operation S213 (YES), operation S214 is performed. In operation S214, the semiconductor memory device 50 programs the program data in the MSB page MSBP of the selected page. The MSB program may be performed with reference to the data of the LSB page LSBP temporarily stored in the page buffers PB1 to PBm. The memory cell in the erase state E may be programmed to have the erase state E or the first upper program state UP1, and the memory cell in the LP state may be programmed so as to have the second upper program state UP2 or the third upper program state UP3. When the MSB program is completed, the semiconductor memory device 50 may output the program pass signal.

According to an exemplary embodiment of the present invention, the determination of whether the data bits corresponding to the program state among the page data are greater than the threshold value may be omitted according to the flag data. Accordingly, compared to the exemplary embodiment of FIG. 5, whether to perform the LSB program may be rapidly determined.

Figure 7:
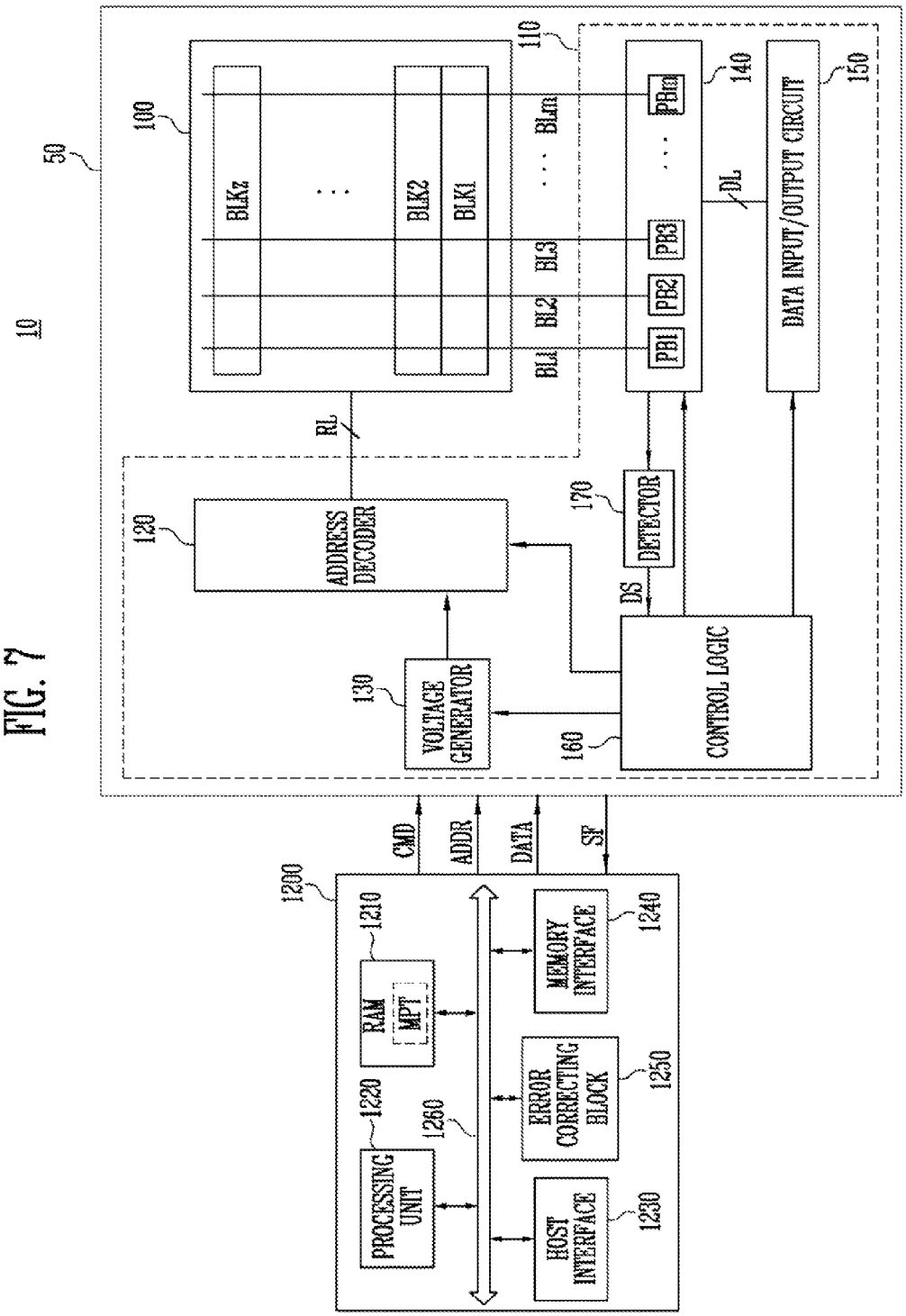
FIG. 7 is a block diagram illustrating a memory system including the semiconductor memory device of FIG. 1.

FIG. 7 is a block diagram illustrating a memory system 10 including the semiconductor memory device 50 of FIG. 1.

Referring to FIG. 7, the memory system 10 includes a memory controller 1200 and the semiconductor memory device 50.

The controller 1200 controls general operations of the semiconductor memory device 50. The controller 1200 receives an access request from a host (not illustrated). When the access request is a program request, the access request may include a logic block address and program data.

The controller 1200 is configured to access the semiconductor memory device 50 in response to the access request from the host. The controller 1200 is configured to control read, write, erase, and background operations of the semiconductor memory device 50. For example, the controller 1200 may be configured to drive firmware for controlling the semiconductor memory device 50.

The controller 1200 includes a Random Access Memory (RAM) 1210, a processing unit 1220, a host interface 1230, a memory interface 1240, an error correcting block 1250, and a bus 1260.

The RAM 1210 is connected to the bus 1260. The RAM 1210 operates under the control of the processing unit 1220. The RAM 1210 stores a map table MPT. The map table MPT stores a mapping relation between a logic block address and a physical block address ADDR. It will be understood that the physical block address ADDR corresponds to the address ADDR of FIG. 1.

In an exemplary embodiment, the RAM 1210 may be formed of a Static RAM (SRAM), a Dynamic RAM (DRAM), a Synchronous DRAM (SDRAM), and the like. In an exemplary embodiment, the RAM 1210 may be used as an operation memory of the processing unit 1220. In an exemplary embodiment, the RAM 1210 may be used as a buffer memory between the semiconductor memory device 50 and the host.

The processing unit 1220 is connected to the RAM 1210, the host interface 1230, the memory interface 1240, and the error correcting block 1250 through the bus 1260. The processing unit 1220 controls general operations of the controller 1200.

The processing unit 1220 manages the map table MPT of the RAM 1210. In an exemplary embodiment, the processing unit 1220 may serve as a Flash Translation Layer (FTL). The processing unit 1220 may update the mapping relation between the logic block address and the physical block address ADDR to the map table MPT. The processing unit 1220 may convert the logic block address into the physical block address ADDR with reference to the map table MPT.

When a program request is received, the controller 1200 may convert the logic block address into the physical block address ADDR. Further, the controller 1200 may provide the program command CMD, the physical block address ADDR, and the program data DATA to the semiconductor memory device 50.

When the power is off, the processing unit 1220 may store the map table MPT stored in the RAM 1220 in the semiconductor memory device 50. For example, the map table MPT may be stored in a predetermined memory block within the memory cell array 100. When the power is on, the processing unit 1220 may load the map table MPT to the RAM 1220 from the semiconductor memory device 50.

The host interface 1230 includes a protocol for performing a data exchange between the host and the controller 1200. In an exemplary embodiment, the hosts interface 1230 is configured to communicate with the host through at least one of various interface protocols, such as a Universal Serial Bus (USB) protocol, a Multimedia Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, and an Integrated Drive Electronics (IDE) protocol, and a private protocol. In an exemplary embodiment, the host interface 1230 may be configured as a proprietary interface.

The memory interface 1240 interfaces with the semiconductor memory device 50. For example, the memory interface 1240 includes a NAND interface or a NOR interface.

The error correcting block 1250 is configured to detect and correct error bits of data received from the semiconductor memory device 50. The corrected data may be output to the host.

The bus 1260 mutually connects the RAM 1210, the processing unit 1220, the error correcting block 1250, the host interface 1230, and the memory interface 1240.

FIG. 8 is a diagram conceptually illustrating the map table MPT of FIG. 7.

Referring to FIG. 8, the map table MPT includes map information on a logic block address to which each page of the memory cell array 100 corresponds. In FIG. 8, a first page PG1 of the first memory block BLK1 corresponds to a first logic block address LBA1. An $n^{th}$ page PGn of the first memory block BLK1 corresponds to an $n^{th}$ logic block address LBAn. When the page corresponds to the specific logic block address, it means that the corresponding page is a programmed page. The first memory block BLK1 is a memory block including the programmed page. The first to $n^{th}$ pages PG1 to PGn of the second memory block BLK2 may not be mapped to a logic block address. The second memory block BLK2 does not include the programmed page. The processing unit 1220 controls the semiconductor memory device 50 to perform the erase operation on the second memory block BLK2. After the erase operation is completed, the processing unit 1220 updates the pages PG1 to PGn of the second memory block BLK2 in the map table MPT as empty physical areas. The first page PG1 of the $z^{th}$ memory block BLKz is mapped to a $j^{th}$ logic block address LBAj. The $n^{th}$ page PGn of the $z^{th}$ memory block BLKz is an empty physical area. The $z^{th}$ memory block BLKz is a memory block including the programmed page.

The first memory block BLK1 and the $z^{th}$ memory block BLKz indicating that the programmed page is included in the map table MPT are defined as open memory blocks. The second memory block BLK2 indicating that the programmed page is not included in the map table MPT is defined as an empty memory block.

It is now assumed that power is suddenly cut off during a program operation of the semiconductor memory device 50. For example, when the first to $n^{th}$ pages PG1 to PGn within the $z^{th}$ memory block BLKz are sequentially performed, power may be suddenly turned off. When power is off during the program operation on the $n^{th}$ page PGn of the $z^{th}$ memory block BLKz, the controller 1200 fails to receive the program pass signal, and thus the processing unit 1220 may not update the logic block address corresponding to the $n^{th}$ page PGn of the $z^{th}$ memory block BLKz to the map table MPT. Otherwise, the processing unit 1220 may not update that the $n^{th}$ page PGn of the $z^{th}$ memory block BLKz is an invalid page on the map table MPT. In this case, even though some memory cells included in the $n^{th}$ page PGn of the $z^{th}$ memory block have increased threshold voltages, the $n^{th}$ page PGn of the $z^{th}$ memory block is indicated as an empty physical area within the map table MPT. Then, the processing unit 1220 may control the semiconductor memory device 50 to perform the program operation on the $n^{th}$ page PGn of the $z^{th}$ memory block with reference to the map table MPT. In this case, the program operation of the semiconductor memory device 50 may not be normally performed. As a result, mapping information on the open memory block within the map table MPT may have relatively low reliability. By contrast, mapping information on the empty memory block within the map table MPT may have relatively high reliability.

According to the exemplary embodiment of the present invention, the processing unit 1220 may transmit a special program command to the semiconductor memory device 50 during the program operation on the page within the open memory block, and transmit a normal program command to the semiconductor memory device 50 during the program operation on the page within the empty memory block. The program command described with reference to FIGS. 5 and 6 may be the special program command. The semiconductor memory device 50 may read page data from the selected page when receiving the special program command, and selectively perform the program operation according to whether the number of bits of the data corresponding to the program state among the page data is greater than a threshold value. The semiconductor memory device 50 may perform the program operation without comparing the page data with the threshold value when receiving the normal program command.

Accordingly, the selected page is prevented from being repeatedly programmed when the special program command is provided. When the normal program command is provided, the program operation may be performed at high speed.

Figure 9:
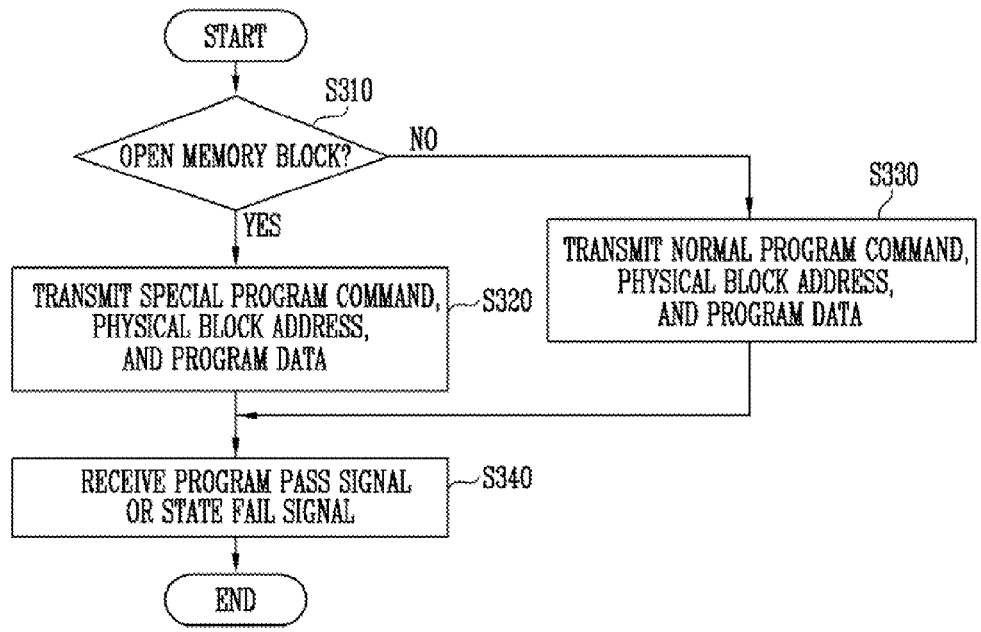
FIG. 9 is a flowchart illustrating a method of operating a controller of FIG. 7.

FIG. 9 is a flowchart illustrating a method of operating the controller 1200 of FIG. 7.

Referring to FIGS. 7 and 9, in operation S310, the controller 1200 determines whether a memory block corresponding to a physical block address ADDR is an open memory block. The processing unit 1220 may serve as the FTL to convert a logic block address from a host into the physical block address ADDR. When it is determined that the memory block corresponding to the physical block address ADDR is the open memory block in operation S310 (YES), operation S320 is performed. When it is determined that the memory block corresponding to the physical block address ADDR is the empty memory block in operation S310 (NO), operation S330 is performed.

In operation S320, the controller 1200 transmits a special program command, the physical block address ADDR, and program data to the semiconductor memory device 50. The special program command may correspond to the program command described with reference to FIGS. 5 and 6.

In operation S330, the controller 1200 transmits a normal program command, the physical block address ADDR, and program data to the semiconductor memory device 50. In operation S340, the controller 1200 may receive a program pass signal or a state fall signal from the semiconductor memory device 50.

Figure 10:
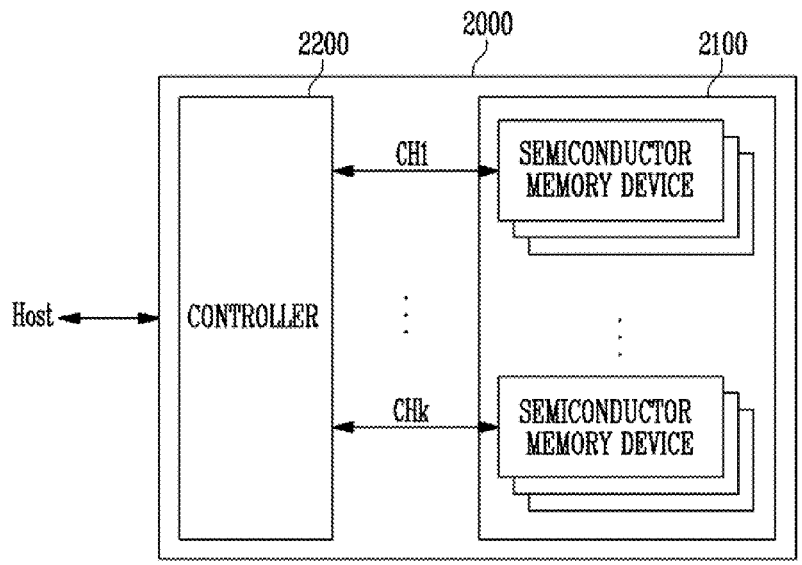
FIG. 10 is a block diagram illustrating an applied example of the memory system of FIG. 7.

FIG. 10 is a block diagram illustrating an applied example 2000 of the memory system 10 of FIG. 7.

Referring to FIG. 10, the memory system 2000 includes a semiconductor memory module 2100 and a controller 2200. The semiconductor memory module 2100 includes a plurality of semiconductor memory devices. The plurality of semiconductor memory devices are divided into a plurality of groups.

In FIG. 10, it is illustrated that the plurality of groups in the semiconductor memory devices communicates with the controller 2200 through first to $k^{th}$ channels CH1 to CHk, respectively. Each semiconductor memory device may be configured and operated in a similar manner to the semiconductor memory device 50 described with reference to FIG. 1.

Each group in the semiconductor memory devices is configured to communicate with the controller 2200 through one common channel. The controller 2200 is configured in a similar manner to the controller 1200 described with reference to FIG. 7, and is configured to control the plurality of memory devices of the semiconductor memory module 2100 through the plurality of channels CH1 to CHk.

Figure 11:
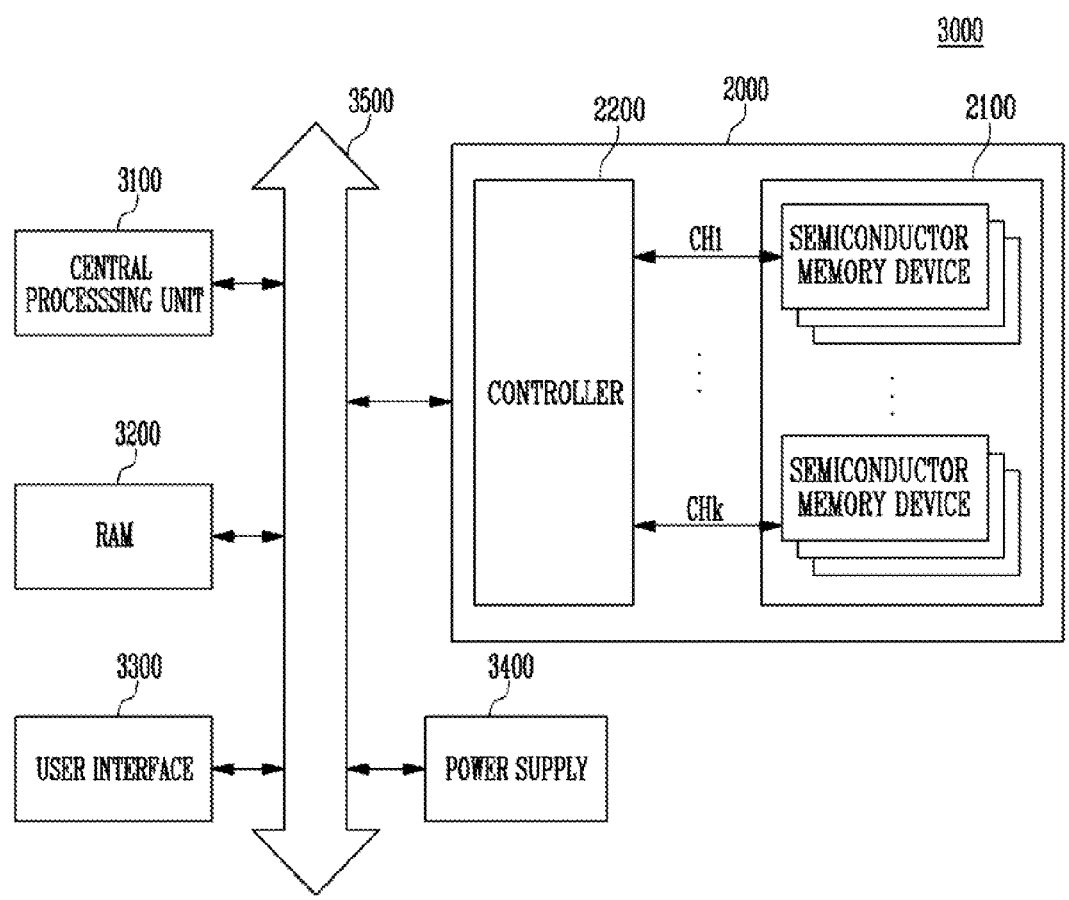
FIG. 11 is a block diagram illustrating a computing system including the memory system described with reference to FIG. 10.

FIG. 11 is a block diagram illustrating a computing system 3000 including the memory system 2000 described with reference to FIG. 10.

Referring to FIG. 11, the computing system 3000 includes a central processing unit 3100, a Random Access Memory (RAM) 3200, a user interface 3300, a power supply 3400, a system bus 3500, and the memory system 2000.

The memory system 2000 is electrically connected to the central processing unit 3100, the RAM 3200, the user interface 3300, and the power supply 3400 through a system bus 3500. Data provided through the user interface 3300 or processed by the central processing unit 3100 is stored in the memory system 2000.

In FIG. 11, it is illustrated that the semiconductor memory device 2100 is connected to the system bus 3500 through the controller 2200. However, the semiconductor memory device 2100 may be directly connected to the system bus 3500. In this case, the central processing unit 3100 and the RAM 3200 may perform functions of the memory controller 2200.

In FIG. 11, it is illustrated that the memory system 2000 described with reference to FIG. 10 is provided. However, the memory system 2000 may be substituted with the memory system 2000 described with reference to FIG. 7.

According to an exemplary embodiment of the present invention, it is possible to prevent a selected page from being repeatedly programmed. Accordingly, the semiconductor memory device with improved reliability is provided.

As described above, embodiments have been disclosed in the drawings and the specification. The specific terms used herein are for illustration, and are not intended to limit the scope of the present invention as defined in the claims. Accordingly, those skilled in the art will appreciate that various modifications and equivalents may be made without departing from the scope and spirit of the present disclosure. Therefore, the scope of the present invention will be defined by the technical spirit of the accompanying claims.

What is claimed is:

1. A method of operating a semiconductor memory device including a plurality of pages, the method comprising:
   receiving a program command, an address corresponding to the program command, and program data corresponding to the program command;
   reading page data from a selected page corresponding to the address in response to the program command;
   determining whether the number of bits of data corresponding to a program state among the page data is greater than a threshold value; and
   outputting a state fail signal indicating that the program data is not stored in the semiconductor memory device, without performing a program operation on the selected page based on a result of the determination.

2. The method of claim 1, wherein the state fail signal is output when the number of bits of the data corresponding to the program state among the page data is greater than the threshold value.

3. The method of claim 1, further comprising:
   programming the program data on the selected page when the number of bits of the data corresponding to the program state among the page data is less than or equal to the threshold value.

4. The method of claim 1, wherein the selected page includes a plurality of memory cells, each of which is defined as a multi-level cell storing a plurality of data bits.

5. The method of claim 4, wherein the address corresponds to a Least Significant Bit (LSB) page of the selected page, and
   the reading of the page data includes reading data stored in the LSB page of the selected page as the page data.

6. The method of claim 5, wherein the state fail signal is output when the number of bits of the data corresponding to the program state among the page data is greater than the threshold value, and
   the method further includes programming the program data on the LSB page of the selected page when the number of bits of the data corresponding to the program state among the page data is less than or equal to the threshold value.

7. A method of operating a semiconductor memory device including a plurality of pages, and flag cells corresponding to the plurality of pages, respectively, the method comprising:
   receiving a program command, an address, and data;
   when the address corresponds to a Least Significant Bit (LSB) page of a selected page, reading page data from the LSB page of the selected page;
   reading flag data from a flag cell corresponding to the selected page;
   determining whether the number of bits of data corresponding to a program state among the page data is greater than a threshold value when the flag data does not correspond to a predetermined value; and
   outputting a state fail signal without performing a program operation on the selected page based on a result of the determination.

8. The method of claim 7, wherein, when the flag data corresponds to the predetermined value, and the state fail signal is output without programming the selected page.

9. The method of claim 7, wherein the state fail signal is output when the number of bits of the data corresponding to the program state among the page data is greater than the threshold value.

10. The method of claim 7, further comprising:
    programming the program data on the LSB page of the selected page when the number of bits of the data corresponding to the program state among the page data is less than or equal to the threshold value.

11. A memory system comprising:
    a semiconductor memory device including a plurality of memory blocks, each of which includes a plurality of pages; and
    a controller suitable for transmitting a special program command to the semiconductor memory device when a program operation is performed on a page within a first memory block, and transmitting a normal program command to the semiconductor memory device when a program operation is performed on a page within a second memory block,
    wherein the semiconductor memory device reads page data from a selected page in response to the special program command, determines whether the number of bits of data corresponding to a program state among the page data is greater than a threshold value, and outputs a state fail signal, which indicates that the program operation corresponding to the special program command is not completed, without programming the selected page based on a result of the determination.

12. The memory system of claim 11, wherein a memory block including a programmed page among the plurality of memory blocks is defined as the first memory block, and
    an empty memory block among the plurality of memory blocks is defined as the second memory block.

13. The memory system of claim 12, wherein the controller stores a map table including a mapping relation between a logic block address and a physical block address, and
    the first memory block and the second memory block are defined based on the map table.

14. The memory system of claim 11, wherein each of the plurality of pages includes a plurality of memory cells, each of which is defined as a multi-level cell storing a plurality of data bits.

15. The memory system of claim 14, wherein the controller transmits an address to the semiconductor memory device together with the special program command,
    the address corresponds to a Least Significant Bit (LSB) page of the selected page, and
    the semiconductor memory device reads data stored in the LSB page of the selected page as the page data.

16. The memory system of claim 11, wherein the state fall signal is output when the number of bits of the data corresponding to the program state among the page data is greater than the threshold value.

17. The memory system of claim 11, wherein, when the number of bits of the data corresponding to the program state among the page data is less than or equal to the threshold value, the semiconductor memory device programs program data from the controller in the selected page.

18. The memory system of claim 11, wherein the semiconductor memory device programs program data from the controller in a second selected page in response to the normal program command.

* * * * *